Nov. 6, 1962 G. L. DICKER 3,062,506
RADIATORS
Filed May 28, 1959 2 Sheets-Sheet 1
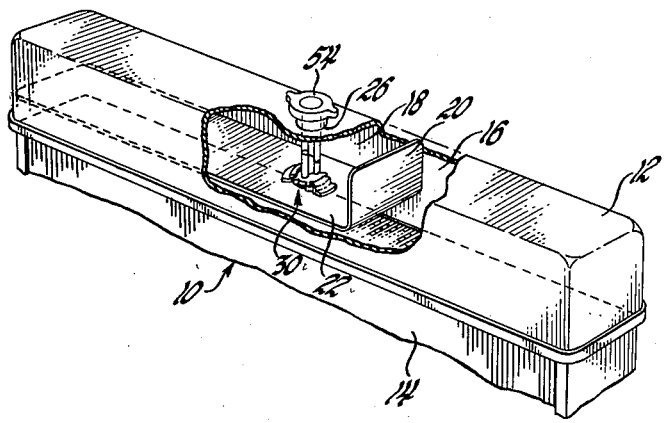
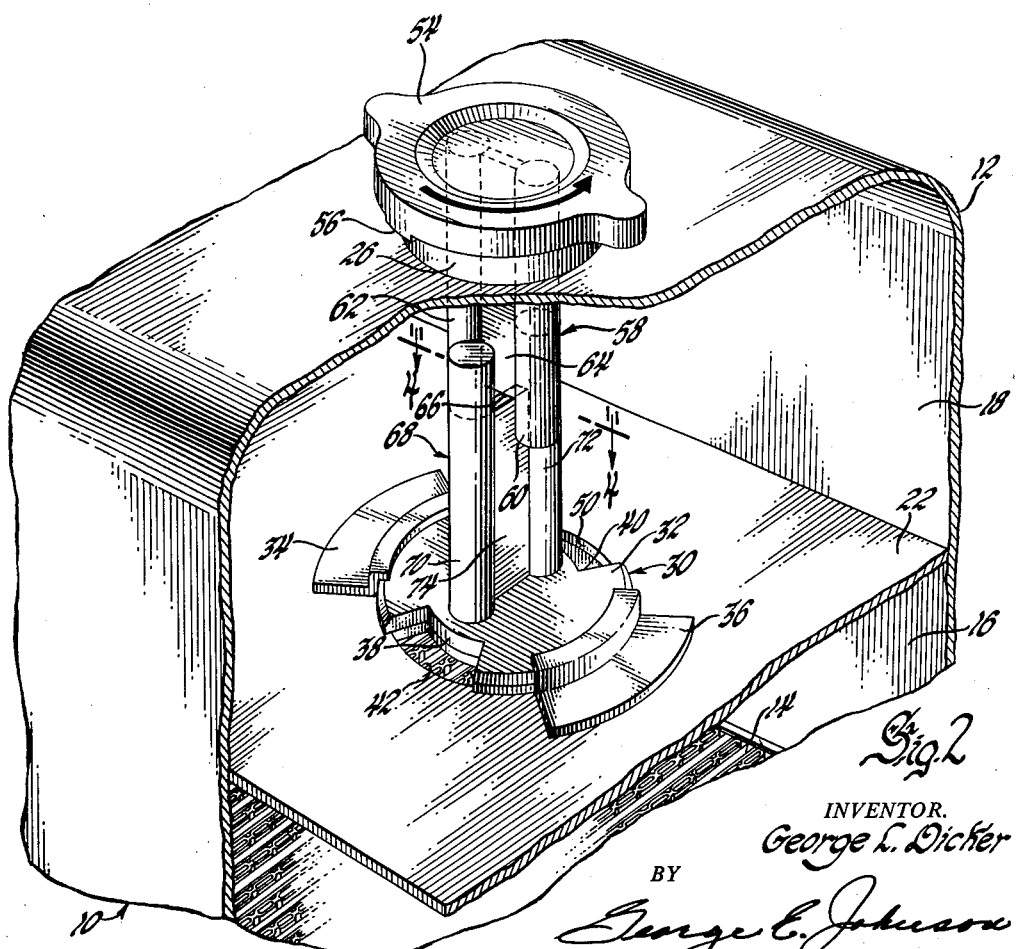
INVENTOR.
George L. Dicker
BY
George E. Johnson
ATTORNEY Nov. 6, 1962 G. L. DICKER 3,062,506
RADIATORS Filed May 28, 1959 2 Sheets-Sheet 2

INVENTOR.
George L. Dicker
BY
George E. Johnson
ATTORNEY

United States Patent Office 3,062,506
Patented Nov. 6, 1962

3,062,506
RADIATORS
George L. Dicker, Columbus, Ohio, assignor to General Motors Corporation, Detroit, Mich., a corporation of Delaware
Filed May 28, 1959, Ser. No. 816,462
1 Claim. (Cl. 257—125)

This invention relates to radiators and more particularly to radiators such as of the type customarily used in the automobile field and having top tanks equipped with filler openings and communicating with radiator cores.

In modern automobile engine coolant systems it is customary to employ considerable pressure to secure certain inherent advantages over the systems once used which were open to the atmosphere. A difficulty has arisen, however, in that for inspection of the liquid level in a given radiator or for adding liquid, removal of the radiator cap or closure from the filler neck often entailed loss of coolant as the pressure dissipated with force and possible injury to the person concerned and damage to the car finish.

The present invention pertains to a structure whereby the disadvantage of pressurized radiators or engine cooling systems as above mentioned is avoided simply and without appreciable cost.

Accordingly, an object of the present invention is to provide an improved radiator in which the emission of pressurized fluid from a cooling system is avoided despite inspection of the radiator as to coolant supply by removal of the radiator cap.

A feature of the invention is a radiator having a top tank with a partition determining two compartments in the tank and a cap serving as a closure for one of the compartments and arranged to control a valved opening giving communication between the two compartments.

These and other important features of the invention will now be described in detail in the specification and then pointed out more particularly in the appended claim.

In the drawings:

FIGURE 1 is a perspective view of the upper part of an automobile radiator forming an embodiment of the present invention, a portion of the upper and side tank wall being broken away;

FIGURE 2 is an enlarged perspective view showing details of the radiator shown in FIGURE 1, a closure cap being in normal operative position;

Figures 3, 4:
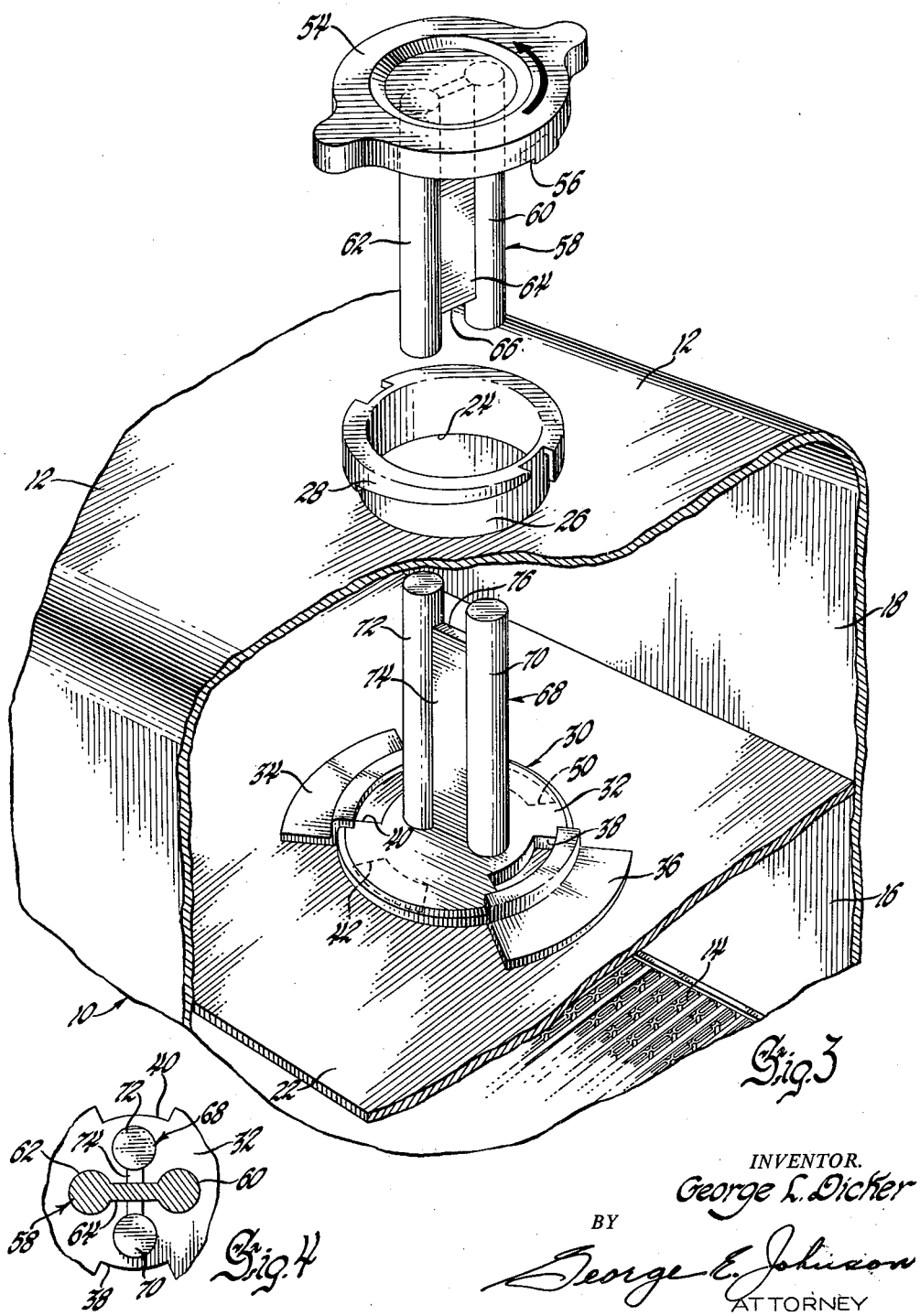
FIGURE 3 is a view similar to that of FIGURE 2 but with the closure cap positioned away from the filler neck to facilitate radiator filling.
FIGURE 4 is a sectional view looking in the direction of the arrows 4—4 in FIGURE 2.

The drawings show a radiator generally indicated at 10. This radiator constitutes a top tank or tank structure 12 and a conventional radiator core 14. The top tank is divided into a main compartment 16 and a filler compartment 18 by means of a partition 20. The latter is L-shaped in section as best shown in FIGURE 1 but it will be understood that the partition 20 may take any of numerous forms in the practice of the present invention. A horizontal portion 22 of the partition 20 may be said to constitute a horizontal partition as will be understood.

The top surface of the tank 12 is apertured as at 24 for communication with a filler neck 26. The top annular edge of the latter is formed as a cammed flange 28 as conventionally employed in radiators and the filler neck communicates with the filler compartment 18.

A valve means generally indicated at 30 is arranged on the horizontal partition 22 in alignment with the filler neck 26. This valve means constitutes a disk 32 which is arranged to rotate in contact with the top surface of the partition 22 and is held in position by two opposed arcuate flange pieces 34 and 36. The latter two pieces are welded to or soldered to the partition 22. The disk bears two diametrically opposed arcuate notches 38 and 40. The partition 22 bears two similarly shaped openings 42 and 50 herein designated as "secondary openings." The notches 38 and 40 as well as the secondary openings 42 and 50 are formed coaxially with the filler neck 26 and the valve means 30. A cap 54 having opposed inwardly directed tongues such as the tongue 56 at its bottom periphery is provided for registering with the flange 28 of the filler neck as will be understood.

Depending from the underside of the cap 54 is an engaging member 58 in the form of two cylindrical portions 60 and 62 joined by a thin web portion 64. It will be noted that the web portion terminates at 66 a short distance above the bottom ends of the cylindrical portions 60 and 62. A second engaging member 68 is attached to the valve disk 32 and extends upwardly. This member is provided with two cylindrical members 70 and 72 joined by a relatively thin web 74 which terminates at 76 short of the upper ends of the cylindrical members 70 and 72.

The arrangements and proportions of the parts are such that when the cap 54 is in its closed position as shown in FIGURE 2, the members 58 and 68 interlock as detachable connections as graphically illustrated in FIGURES 2 and 4. At this time, the notches 38 and 40 are in registry with the openings 42 and 50 respectively as shown in FIGURE 2. Communication is, therefore, had between the two compartments 16 and 18 when the cap 54 is serving as a radiator closure. In checking the coolant level, the cap 54 must be removed. In order to do so, the cap first must be rotated in the direction of the arrow shown on the cap in order subsequently to release the cap from the radiator by disengagement of the cap tongues through the notches formed in the filler pipe flange. When the cap is thus rotated for disengagement, the engaging members 58 and 68 serve as interlocking or connecting means between the cap and the valve means. As the cap is rotated, the valve disk 32 is likewise rotated an extent determined by the notches in the filler pipe flange thereby to cut off communication between the two compartments 16 and 18 as seen in FIG. 3. As a result there can be no loss of pressure or coolant from the main compartment 16 and the core 14. As the pressure in the compartment 16 is not disturbed by removal of the cap, there is no danger to the individual performing the inspection and additional coolant may be safely added if required. When the cap 54 is again placed in its closed position, as shown in FIGURE 2, normal communication between the compartments 16 and 18 will be reestablished. It will be appreciated that the normal coolant level desired will be at some level in the filler compartment 18.

I claim:

A radiator comprising a unitary top tank and core, a partition in said top tank dividing the interior of the latter into a compartment connected to said core for the containment of a main supply of liquid coolant and a filler compartment, said partition defining a passage, a filler neck on the top of said tank and communicating with said filler compartment, cam means on said filler neck, a cap detachably and rotatably secured to said filler neck by said cam means as a closure, said passage in said partition being coaxial with said cap and connecting said compartments, a rotary valve controlling said passage, interlock means extending in the direction of the axes of said filler neck and passage and detachably connecting said cap and valve for simultaneous rotation of the cap and valve, said interlock means being disengageable by removal of said cap from said filler neck, and the arrangement being such that rotation of said cap as a preliminary to its removal from said filler neck effects closure of said passage by said valve.

References Cited in the file of this patent

UNITED STATES PATENTS

| | | |
|---|---|---|
| 1,398,025 | James | Nov. 22, 1921 |
| 1,717,689 | Hunt | June 18, 1929 |

FOREIGN PATENTS

| | | |
|---|---|---|
| 85,492 | Switzerland | June 16, 1920 |